Patented June 10, 1941

2,245,456

UNITED STATES PATENT OFFICE 2,245,456

CAST ALUMINUM PULLEY

Percy L. Bowser, Jr., University City, Mo., assignor to The Sterling Corporation, St. Louis, Mo., a corporation of Delaware Application January 24, 1940, Serial No. 315,346

5 Claims. (Cl. 74—230.2)

This invention pertains to metal pulleys and to a pulley cast of an aluminum alloy.

The well known form of grooved pulley which operates in cooperation with a flexible belt either of the V-type or of the round type, when made of cast iron or similar metal, has a number of objectionable features. Among these may be mentioned its excessive weight, the difficulty in casting, undue wear, and a marked tendency for the belt-engaging surface to take on a high polish with use, thereby reducing the coefficient of friction causing the belt to slip, and in many cases tending to set up a squeaky noise.

It is an object of this invention, therefore, to provide a pulley which will overcome most or all of the above objections.

Another object of this invention is to provide a pulley which will be light in weight, hard enough to resist wear without being too hard, having the ability to maintain a good friction surface for engagement with the belt, and to avoid any tendency to set up noises.

Further objects will appear from the following description taken in connection with the accompanying drawing which shows a perspective view of a pulley embodying this invention.

In accordance with this invention the pulley is made of an aluminum-silicon alloy which is particularly adapted for the construction of pulleys of this type. The alloy may contain in addition to aluminum and silicon one or more metals which have desirable influence from the standpoint of hardness and wear. An alloy which has been found to have the desired properties is as follows:

| | Per cent (about) |
|---|---|
| Silicon | 11.5 |
| Copper | 6.5 |
| Magnesium | 0.5 |
| Zinc | 1.5 |
| Iron | 1.1 |
| Aluminum | balance |

While pulleys of this alloy may be produced by sand-casting, better results may be produced by chill-casting, as in permanent molds of metal.

It has been shown by tests that while pulleys made of aluminum-copper alloys show excess wear at the belt-engaging surfaces, this is not true of pulleys made of aluminum-silicon alloys; such latter pulleys have been operated for long periods under heavy load conditions without showing objectionable wear.

Referring now to the accompanying drawing, the figure represents a pulley of any usual type used with a V or round belt and may comprise a hub 1, spokes 2, and a rim 3. The rim 3 is provided with a groove 4 which usually has conical faces forming in cross-section a V. Such a groove is adapted for cooperation with a belt 5. The belt in the figure is shown as a V belt. However, an ordinary round belt may also be used.

Tests made upon pulleys cast from the above-described alloy have maintained the surfaces of the groove 4 in good condition after long continued operation. These faces not only showed very little evidence of wear, but also showed that a high polish is not produced and the surface while smooth, maintains a sufficient roughness to preserve a high coefficient of friction between the belt and the pulley face.

It is believed that the addition of silicon in the percentage indicated to the aluminum alloy constituted by the remaining ingredients tends to increase the hardness or toughness of the metal so as to resist wear. This probably is due to the presence of silicon or silicon compound crystals at the surface engaged by the belt 15, which prevents that surface being torn away by the friction of the belt. At the same time, the condition of the matrix of the aluminum and other metals, where employed, is so maintained as to avoid developing an excessively highly polished belt-engaging surface, in order to avoid slipping of the belt. This, it is believed, also tends to avoid setting up the squeaking noises which are experienced in pulleys of other materials. These properties are enhanced by chill-casting and heat-treating.

The proportions of the various ingredients given in the above tabulation have been found to give satisfactory results. However, these proportions may be varied to some extent without losing the benefits of this invention. For instance, the silicon ingredients may be varied between 7% and 18%, and the resulting metal will still have the beneficial properties set forth above. Furthermore, more or less of the additional metals may be used as desired as noted above and such alloy will then contain at least 65% aluminum.

It has also been found beneficial to heat-treat the pulley castings so as to age the metal. By this treatment its properties of hardness and uniformity are improved and are rendered more permanent. This treatment may be carried out by heating the casting in a suitable furnace to a temperature of 375° to 400° F. and to maintain this temperature from 8 to 9 hours.

The invention having thus been described, what is claimed is:

1. A pulley of the character described composed of an aluminum-base alloy containing 7%–18% silicon, a hardening metal and at least 65% aluminum.

2. A pulley of the character described composed of an aluminum-base alloy containing 7%–18% silicon and the balance substantially all aluminum.

3. A pulley of the character described composed of an alloy substantially of aluminum and containing 11.5% silicon, 6.5% copper, 0.5% magnesium, 1.5% zinc, and 1.1% iron.

4. A pulley of the character described composed of chill-cast aluminum-base alloy containing 7%–18% silicon and the balance substantially all aluminum.

5. A pulley of the character described composed of chill-cast and heat-treated aluminum-base alloy containing 7%–18% silicon and the balance substantially all aluminum.

PERCY L. BOWSER, Jr.